Nov. 15, 1949     C. E. WEHN     2,487,911
CLUSTER CUTTER
Filed Jan. 18, 1946
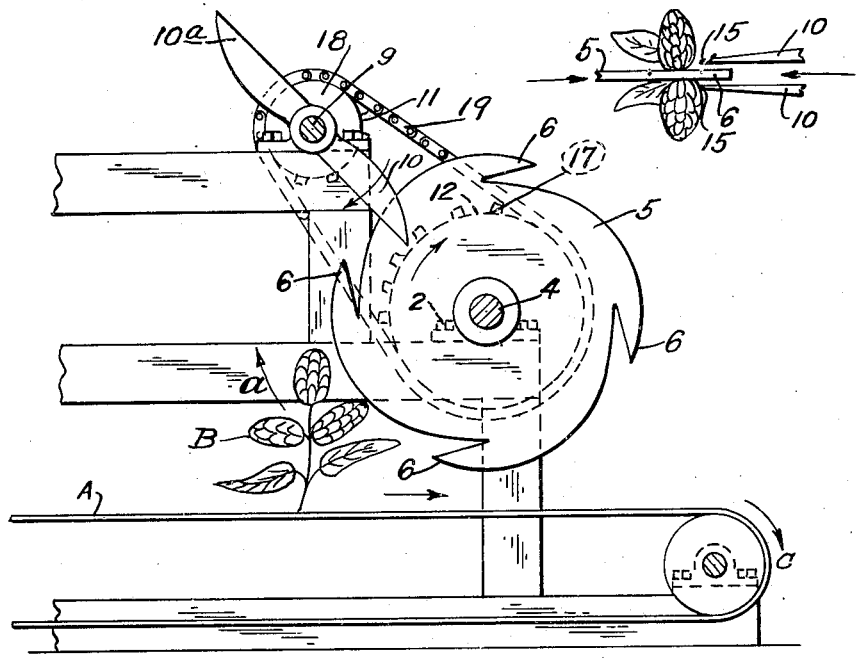
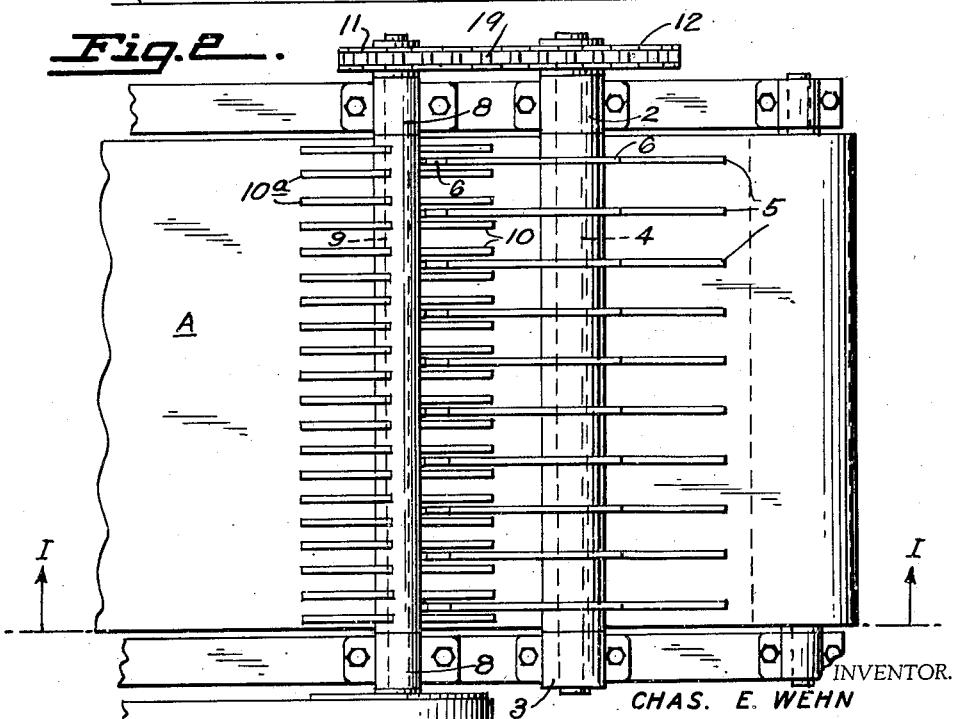
INVENTOR.
CHAS. E. WEHN
BY Thomas Astberg
ATTORNEY.

Patented Nov. 15, 1949

2,487,911

UNITED STATES PATENT OFFICE 2,487,911

CLUSTER CUTTER

Charles E. Wehn, Alameda, Calif.

Application January 18, 1946, Serial No. 642,091

2 Claims. (Cl. 130—30)

This invention relates to a hop cluster cutter.

Hops are grown on vines which are trained vertically along heavy strings or cords to overhead trellis wires. The hop vines grow to a height of from twelve to twenty feet or more and comprise a main stalk with many hanging arms which carry the crop.

Hops are harvested either by machine or hand picking and in either instance the object is to remove the hops singly or in clusters from the arms.

A cluster may comprise several hops which are attached by stems, usually united beneath a pair of leaves on the arm.

When harvesting correct practice is that the hops be removed singly or in clusters of not more than three hops. The berries, hereafter referred to as hops, are elongated cones varying from pigeon egg to hen egg in size. When first forming they are quite firm and green in appearance, but as they ripen they turn straw color and like rose petals they become more and more fluffy as they ripen on the vine.

Thus a hop crop must be harvested quickly as a sudden hot spell will often over ripen the hops. When a cluster is picked or stripped from the arm, a pair of leaves is usually attached as the hop stems and leaves are united. The picker then should remove the leaves and separate the cluster. This slows down the picking operation which becomes an expensive and laborious task.

The object of the present invention is to provide a machine whereby clusters of several hops may be quickly and readily separated. A gentle method would be to hold a cluster in the hand and with scissors clip the stems, so that leaves and hops would be separated. To circumvent such a tedious process, the present invention operates in a similar gentle manner. A hook on a revolving disc engages the stem of a cluster. As the hook raises the cluster, the hops settle to either side of the disc and only the stem on the hook passes through the cutters, the hops falling away uninjured.

A machine suitable for this purpose is shown by way of illustration in the accompanying drawings in which:

Fig. 1 is a central vertical longitudinal section taken on line 1—1 of Fig. 2;

Fig. 2 is a plan view of the machine; and

Fig. 3 is a diagrammatic view showing the position assumed by the knives 10—10 when engaging a hook to cut a cluster carried thereby.

Referring to the drawings in detail, A indicates a continuously moving endless conveyor of suitable construction to which broken arms containing one or more clusters and single clusters are delivered in any suitable manner. Disposed above the conveyor is a pair of bearing members 2 and 3, and journaled in said bearing and extending crosswise of the conveyor is a shaft 4 upon which is secured a plurality of spaced discs 5 on the peripheral edges of which are formed a plurality of hook-shaped members 6. A second set of bearing members is indicated at 8 and journaled therein and extending crosswise of the conveyor is a shaft 9 upon which is secured a plurality of pairs of cutters 10—10, there being two pairs of cutters 10—10 and 10a—10a for each disc 5.

In actual practice power may be transmitted to the shafts 4 and 9 in any suitable manner, for instance through a pulley such as shown at 11. Inasmuch as there are four hook members shown on each disc, the speed of rotation will be two to one, that is while shaft 4 rotates one revolution, shaft 9 will rotate two so that a pair of cutters 10—10 will sweep by each hook. As a cluster of hops such as indicated at B approaches the rotating disc 5, a hook member 6 will engage the cluster and raise it upwardly towards the cutters 10—10 in the direction of arrow a, and as the cutters sweep past the hook they will sever the stems and separate either clusters or leaves whichever is attached. A portion of a cluster will obviously drop back when cut free, but such remaining portions of the cluster will be picked up again and again by the hooks 6 and cut until all hops and leaves are separated. This operation is rapid and simple and as the hops are separated from the cluster, they drop back on to the conveyor and finally discharge from the end thereof as indicated by the arrow c. At this point the hops may be directed to a separator, not shown, where leaves and stems are separated from the hops and clean hops result.

To illustrate the importance of a machine of this character, let it be assumed that the hops at a certain place are being hand picked. Hand pickers here in California were during the harvesting season of 1945 paid three and one-half cents a pound. An average picker will pick approximately two hundred pounds of average clean hops during an eight to ten hour day and as such will make seven dollars. Hop buyers require clean picking, that is the hops picked must be separated and there must be no leaves larger than a silver dollar or stems as a hop grower is penalized if more than eight percent of stems or small leaves are found in the picked hops. A premium is paid for cleaner hops than eight percent. Growers are continually in trouble with contract pickers. A clean picker who picks hops separately from the vine does not earn enough to say on the job and either quits or resorts to stripping. This process produces poundage for the picker, but is disastrous for the grower. Stripping is dirty picking. Holding an arm by the vine end and using heavy gloves, clusters and leaves are stripped into the picker's basket. Occasionally the picker will twist the mass in an endeavor to break it all into smaller parts. Dirty pickers cause extra labor and expense at the kilns as the large leaves and stems do not dry as quickly as properly separated clean hops and often after curing the bales have to be opened, spread out and re-cured.

During the 1945 harvest, the labor shortage made it impossible to get clean pickers. To save the crop, dirty picking was permitted as speed was desirable so that the crop could be harvested as quickly as possible. Growers were better off accepting dirty hops, and cleaning and separating the clusters after picking.

By having a machine of the character here described, it becomes possible for the average picker to double his poundage, that is for instance to four hundred pounds a day as they are allowed to pick clusters and include a certain percentage of leaves. Pickers can readily be obtained if allowed to pick in this manner and are satisfied with a price of two and one-half cents a pound. At that rate they will average ten dollars a day. Hops picked in this manner are known as dirty hops. When such hops are hauled in, they are first run through a revolving screen or similar separator where all the individual hops fall through. The remaining hops in the form of clusters or broken arms and leaves are then delivered to the conveyor of the machine here shown and are there rapidly separated into individual hops and later cleaned by being passed through a separator. In this manner the owner gets his crop picked at a more rapid rate. The individual pickers make higher wages, and the grower himself pays less as the machine operation figures approximately one-half cent a pound. In other words he gets twice the amount of hops picked for three cents a pound.

The machine here shown is not only useful in connection with hand picking, but is equally useful in connection with the machine picking as clusters and arms are broken off during machine picking and must be separately handled. Hence, broken arms and clusters from machine operations may be fed to the machine here illustrated where they are broken up into individual hops and later separated. The discs 5 and the hooks formed thereon may be of uniform thickness throughout, but sharp corners are preferable on each side of the hook 6 as shown in Fig. 3. The cutters 10—10 also shown in this figure rotate in a direction toward the hooks and their cutting edges are indicated at 15—15. Thus, if a cluster is resting on the hook as shown and if the cutters 10—10 are positioned close to the opposite faces of the disc, it is obvious that as the hook passes between cutters 10—10, the stems of the cluster will be severed and the hops will fall off. In order to insure a two to one drive between the shafts 9 and 4, a sprocket and chain drive is provided and connects the shafts as clearly shown in Figs. 1 and 2. The sprockets are indicated at 17 and 18 and the chain at 19. Obviously, cutters of other shapes may be employed, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. A hop cluster parter, comprising a continuously moving conveyor belt to which clusters of hops are delivered, a shaft journaled crosswise of the belt and above the same, a plurality of spaced discs secured on the shaft, a plurality of hook-shaped members projecting from the peripheral edge of each disc, a pair of cutters for each disc, said cutters being disposed one on each side thereof, means for imparting rotational movement to the disc to cause the hook-shaped members to engage and remove the hop clusters from the conveyor and to carry the clusters to the cutters so as to cut the hop stems and free the hops from the clusters, and means for imparting rotational movement to the cutters in a direction opposite to the discs and the hook-shaped members formed thereon.

2. In a machine of the class described, a movable conveyor, a hook member adapted to carry a cluster of hops, said hook member being rotatable about an axis spaced therefrom and over said conveyor, a pair of cutters mounted for rotation on a common axis on opposite sides of the path of movement of said hook member, said common axis being parallel to said first axis, each cutter having a cutting edge movable across the path of movement of said cluster of hops and closely adjacent said hook member, said hook member comprising a forwardly directed finger on the periphery of a generally flat disc and said spaced axis being substantially normal to said disc.

CHARLES E. WEHN.

REFERENCES CITED

The following references are of record in the file of this patent:

UNITED STATES PATENTS

| Number | Name | Date |
| --- | --- | --- |
| 79,072 | Holt | June 23, 1868 |
| 266,972 | Coleman | Nov. 7, 1882 |
| 526,594 | Weatherbee | Sept. 25, 1894 |
| 908,271 | Jones | Dec. 29, 1908 |
| 2,226,206 | McConnel et al. | Dec. 24, 1940 |